J. W. PORTER.
TRACTOR.
APPLICATION FILED OCT. 6, 1914.

1,165,708.

Patented Dec. 28, 1915.
6 SHEETS—SHEET 3.

Inventor
Joseph W. Porter,

J. W. PORTER.
TRACTOR.
APPLICATION FILED OCT. 6, 1914.

1,165,708.

Patented Dec. 28, 1915.
6 SHEETS—SHEET 4.

UNITED STATES PATENT OFFICE.

JOSEPH W. PORTER, OF MARYSVILLE, CALIFORNIA, ASSIGNOR OF ONE-HALF TO RICHARD L. ARNDT, OF MARYSVILLE, CALIFORNIA.

TRACTOR.

1,165,708.  Specification of Letters Patent.  Patented Dec. 28, 1915.

Application filed October 6, 1914. Serial No. 865,293.

*To all whom it may concern:*

Be it known that I, JOSEPH W. PORTER, a citizen of the United States, residing at Marysville, in the county of Yuba and State of California, have invented certain new and useful Improvements in Tractors, of which the following is a specification.

This invention relates to tractors of the crawler or caterpillar type, and the principal objects in view are to reduce to a minimum the friction of the applied motor force relatively to the directly operating tractive devices through the medium of a double set of balls and their complemental holding and engaging elements on each side of the body and thereby ease the movement and facilitate the operation of the said tractive means and the progress of the tractor as a whole; to utilize ball channels with continuous openings around same to expose the balls in their working positions and having cover plates in part closing the channels to shield the balls from detrimental influences of accumulated dust or grit, the channel being formed with V-shaped grooves and semicircular at their ends, and inclined at their upper portions toward the front of the machine to cause the balls to readily move toward their points of maximum service and to compensate the relation of travel of the balls in the semi-circular ends and conjointly with the inside of an endless linked belt constituting the tractive means and thus relieve any gain or loss in ball travel which would otherwise occur, and thus reduce friction to an absolute minimum; to have the main frame or machine body supporting brackets at each side engage relief springs located between the ball channels to overcome shocks or jars on the frame or body due to conditions of travel; to provide a strong and durable endless link belt embodying compound links having among other advantageous structural features base members with overlapping elevated flanges at the adjacent movable edges to provide a continuous bearing and grit proof link and belt and also to provide structural means for taking up the pulling stress on the belt at the base or ground line and thereby materially increase the practical life of the belt or chain; to improve the transmission gears by constructing and arranging them in such manner as to condense the same relatively to space usually occupied by transmission gears of tractors and to equip these improved gears with means for easily controlling the operation of the same; to provide for taking up and preventing side thrust of the several parts; to simplify the construction and reduce the friction of the working parts of the steering or tiller wheel, and to generally improve and render more efficient the several parts of tractors of the class specified.

With these and other objects and advantages in view, the invention consists in the preferred construction and arrangement of parts which will be more fully hereinafter described and claimed and subject to such variations as fairly fall within the scope of the claims.

The numeral 5 designates the frame or body which may be of any approved or desired construction and pattern to adapt the same for its intended purpose and equipped with such accessories as are usually embodied in tractor organizations and necessary to the proper running of this class of machines. Only so much of the frame or body and operative parts are shown in the present instance as are necessary to demonstrate the practicability of the improvements, and the clutches and their levers which will be hereinafter described are only formally represented as they are well understood in this and analogous arts and may be positioned or located in the practical construction of the improved tractor to the best advantage. An engine 6 of any suitable type and power is installed in the frame or body and has a rearwardly projecting shaft 7 with a friction drive 8 and a knuckle joint 9. Connected to this knuckle joint 9 is the forward end of a shiftable pinion shaft 10 having a bevel pinion 11 on its rear end and movable by operation of a suitable shifting lever 12 to engage either one of two opposingly positioned bevel gears 13 and 14 of the same diameter and keyed to the inner ends of shafts 15 mounted in suitable bearings. When the pinion 11 is shifted to engage the gear 13 the tractor moves forwardly, and when thrown into engagement with the gear 14 a reverse movement is given to the tractor. On the outer sides of the gears 13 and 14 and loose on the shafts 15 are spur gears 16 and 17 which are of double helix, V-shaped or herring bone form, the gear 16 being smaller in diameter than the gear 17. The gears 16 and 17 are connected to their shafts when desired by suitable friction clutches 18 and 19 operated by levers 20 and 21, the said clutches being keyed to the shafts. The gears 16 and 17 are respectively held in continual engagement with spur gears 22 and 23 of a form similar to said gears 16 and 17, the gear 22 in mesh with gear 16 being of the same diameter as the gear 17, and the gear 23 in mesh with gear 17 being of the same diameter as the gear 16. The gears 22 and 23 are connected by a center core 24 turned to revolve in a bearing 25 and bored to loosely receive the inner ends of drive shafts 26 extending outwardly therefrom and transversely with relation to the frame or bed 5. The gears 22 and 23 are adapted to be secured to the shafts 26 by suitable friction clutches 27 keyed to said shafts and operative by levers 28 to engage the said gears. The shafts 15 and 26 are double and have their inner ends in contiguous relation to compensate for faster or slower movement on one side of the machine than the other in turning or by reason of other causes, the connected mechanism all readily accommodating and compensating for this change of movement. The shafts 15 have a supporting or transmission function, but the drive shafts 26 extend outwardly into the crawler mechanism or organizations and each has a bull pinion 27$^a$ fixed on its outer end to rotate therewith for similarly driving the crawler mechanisms on each side from the engine through the transmission and motion governing gearing heretofore explained.

As both crawler mechanisms or organizations at opposite sides of the machine or tractor are duplicates in construction and arrangement of the several parts thereof, it will only be necessary to specifically describe one organization. Extending outwardly from each side of the frame or body 5 is an axle end or extremity 28$^a$ and rotatably mounted thereon is a drive sprocket 29 having an internal gear 30 extending fully around the inner periphery thereof. The sprocket 29 is closely flanked on opposite sides by the rear semi-circularly curved ends 31 of the ball channels or races which continue at their upper portions with forwardly and downwardly inclined directing ways or members 32 continuing into forward semi-circularly curved ends 33 which are smaller or of less radius than the rear ends 31. The curved ends 31 and 33 both continue into lower channel members 34 which have a long sweeping curve or longitudinally convex contour to render the tractive means more effective. The ball channels or races are each engaged by a plurality of balls 35, or, each channel or race has the said balls 35 movably mounted therein and shiftable therethrough. The balls 35, however, have sufficient loose play to permit them to readily move or travel in the races, and their effective work is performed when in engagement with the lower members 34 of the channels or races, said lower members serving as the adjacent bearing means for the tractive means directly operating with the ground surface.

Each ball channel or race has a V-shaped groove 36 and parallel side flanges 37 and 38 which are continuous, the outer side flange 38 being provided with an inturned retaining lip 39 to hold the balls loosely intact with the channel or race. Each channel or race is also fully open between the free edges of the flanges 37 and 38 to expose the balls in their working position, or, to project portions of the balls from the races for active service particularly when they reach the lower members 34 of the channels or races where they materially ease the movement of the tractive means during the gripping action thereof on the ground or road over which the machine travels and at which time the greatest weight stress will be imposed on said tractive means. The upper portions of the ball races are provided with cover plates 40 extending from points slightly in advance of the upper terminals of the semi-circular curves of the rear ends 31 or upper interference points, forwardly over the downwardly inclined directing ways or members 32 and well downwardly over the forward semi-circular ends 33 to the forward lower interference points to shield the balls moving through the upper portions of the races and downwardly through portions of the forward semi-circular curved ends 33 from dirt and grit falling from the tractive means or link belt moving thereover when making its circuit. This protection of the balls in the channels or races prevents the least obstruction to free movement thereof and undue wear of the same. Hard metal inserts or plates 41 are secured in the grooves 36 of the lower members 34 where the greatest resistance must be set up to wear on the channels or races in view of the fact that the balls when moving through the said members 34 are subjected to the greatest weight stress and pressure.

Figure 8:
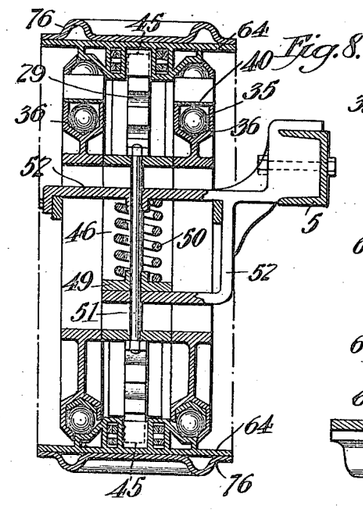
Fig. 8 is a transverse vertical section taken on the line 8—8 of Fig. 2.
Figures 9, 10:
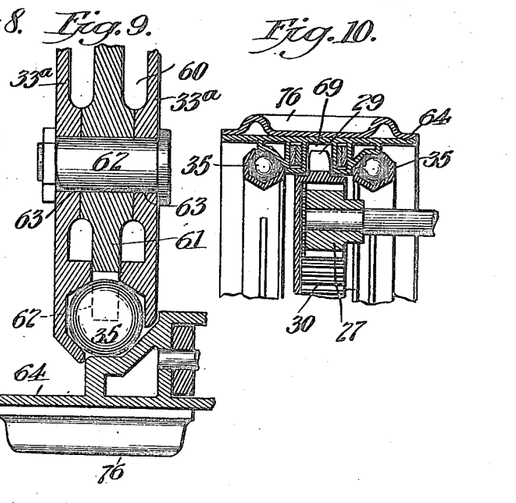
Fig. 9 is a detail section through the ball spacing wheel.
Fig. 10 is a detail section on the line 10—10 of Fig. 2.
Figure 11:
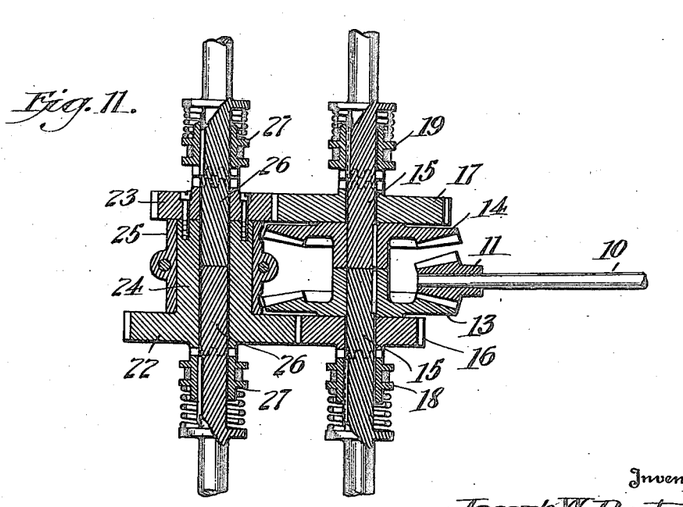
Fig. 11 is a horizontal section on an enlarged scale of the transmission gearing.
Figure 12:
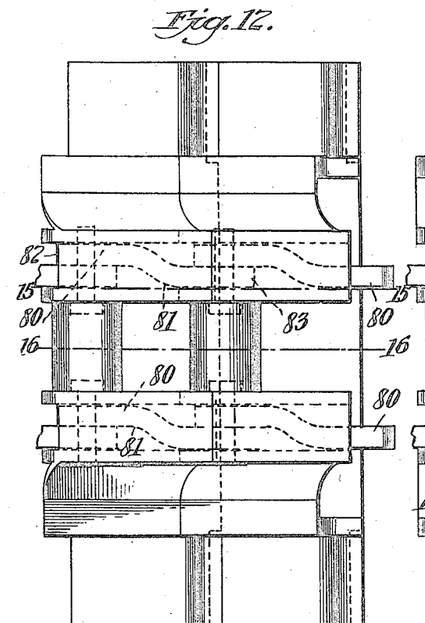
Fig. 12 is a top plan view of several of the links shown connected.
Figure 13:
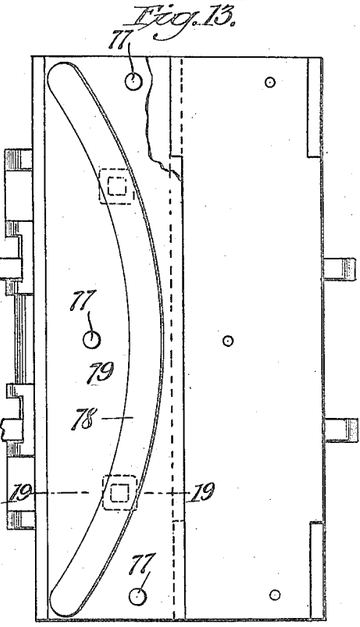
Fig. 13 is a bottom plan view of links shown by Fig. 12.
Figure 14:
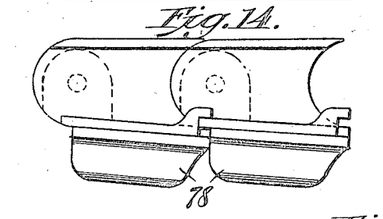
Fig. 14 is a side elevation of several of the links of the link belt.
Figure 15:
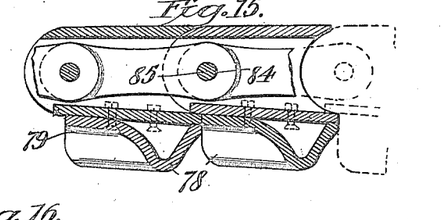
Fig. 15 is a longitudinal vertical section of a portion of the link belt or tractive means taken in the plane of the line 15—15 Fig. 12.
Figure 16:
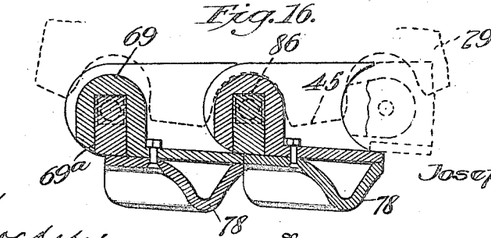
Fig. 16 is a longitudinal vertical section of a portion of the link belt or tractive means taken in the plane of the line 16—16 of Fig. 12.
Figure 17:
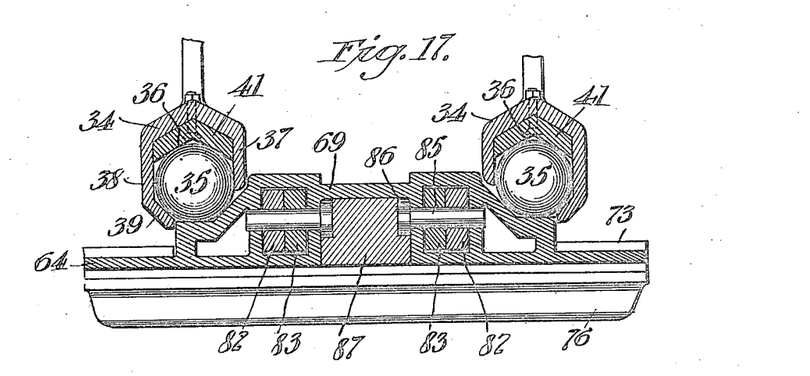
Fig. 17 is a transverse vertical section through one of the link belts or tractive means and portions of the adjacent ball races.
Figure 18:
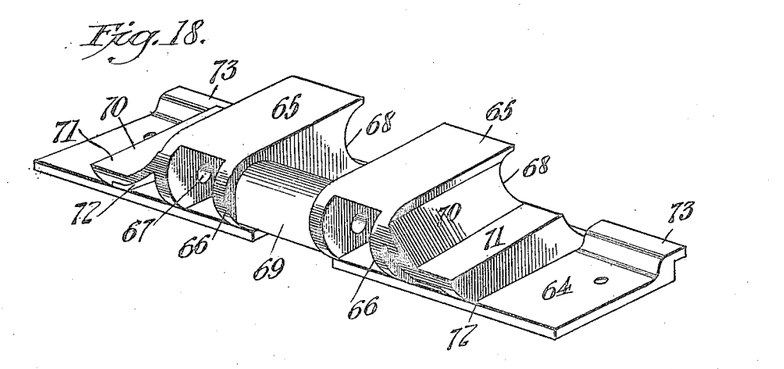
Fig. 18 is a perspective of one of the links.
Figure 19:
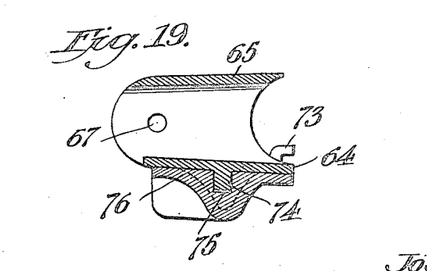
Fig. 19 is a detail section taken in the plane of line 19—19 of Fig. 13.

The ball channels or races have the rear semi-circular ends 31 thereof provided with central supporting hubs 42 to receive the axle end or extremity 28$^a$, and between the hubs 42 a space sleeve or distance bushing 43 is mounted on the axle end or extremity 28$^a$ and terminally engages the inner opposing ends of said hubs. On the space sleeve or bushing 43 the hub 44 of the drive sprocket 29 is loosely or rotatably mounted, the teeth 45 of said sprocket rotating between the ball races as shown by Fig. 8.

At about the center of each crawler mechanism or organization, is a vertically disposed jar or shock absorber mounted in a central rectangular hollow distance piece or member 46 with bolt lugs 47 at the corners engaged by through bolts 48 which extend through adjacent portions of the bodies or supports of the ball channels or races to provide a solid effect with relation to the channels or races. Within the distance piece or member 46 is a supporting bar 49 on which rests the lower end of a spring 50, a retaining bolt 51 extending centrally through the distance piece or member 46, spring 50 and bar 49 and nutted at opposite ends. A supporting bracket 52 projecting from the adjacent side portion of the frame or body 5 engages the upper extremity of the spring 50, and the supporting bar 49, and by this means the said frame or body is relieved of shock or jar incident to the travel of the machine.

The forward smaller ends 33 of the ball races or channels have suitable side housing plates 33$^a$ provided with horizontal slotted guide-ways 53 in which flanged bearing boxes 54 are adjustably mounted and receive the opposite extremities of a shaft or axle 41' of a forward idler sprocket 55 of the same dimensions as the drive sprocket 29, the tractive means or link belt being trained over both of these sprockets. The rear ends of the boxes 54 are engaged by tension springs 56 having adjusting screws 57 extending through outstanding lugs 58 of fixed supporting members 59. By this means the idler sprocket 55 may be adjusted to take up slack in or to loosen the tractive means or link belt or chain drive, and also to ease the movement of the latter through the operation of the tension springs 56.

Below and slightly in advance of the location of the shaft or axle 41', of the idler sprocket 55 a cavity 60 is formed and in the space between the side housing plates 33$^a$ is a ball spacer 61 mounted on a shaft 62 loosely rotatable in bearings 63 provided in the plates 33$^a$. This ball spacer 61 has peripheral teeth 62$^a$ with intervening spaces of such dimensions as to readily engage and separate the balls as they pass from the forward lower extremity of the ball channel or race, the teeth 62$^a$ projecting forwardly far enough to regularly engage the individual balls and space them at predetermined intervals on the tractive means or chain belt as the tractive means comes beneath the lower members 34 of the ball channels or races. The object of this spacing or separation of the balls is to reduce the friction of the balls relatively to each other where they should be free to rotate at the location where their greatest anti-frictional action is required or when subjected to the greatest weight strain in view of the tractive operation of the tractive means on the ground surface.

The tractive means, link belt or chain drive embodies a plurality of enlarged links each comprising a rectangular plate 64 with two elevated channel bodies or link housings 65 on opposite sides of the center. The channel bodies or link housings 65 have convex ends 66 projecting slightly beyond one side edge with holes 67 drilled in the centers of said ends 66, of the plate 64 and opposite concave ends 68 slightly inset from the opposite side edge of the plate. Extending transversely across from one body or housing 65 to the other is a hollow sprocket tooth engaging lug or rib 69 with opening 69$^a$ through the bottom of the plate. The outer side portions of the channel bodies or housings 65 are provided with downwardly and outwardly inclined flanges 70 merging into horizontal ball bearing members 71 having outer vertical ribs or webs 72 integral therewith and the rectangular plate 64. The opposite extremities of the flanges 70, bearing members 71 and ribs or webs 72 of all the links are closely arranged and freely move relatively to each other. The inclined flanges 70 serve as side thrust guards to maintain the several link members and the tractive means as a whole from laterally moving during operation thereof.

The one side edge of each plate 64 from the outer sides of the channel bodies or housings to the outer ends of said plate are provided with upwardly beveled overhanging flanges 73 to overlap the adjacent edge of the next companion plate to insure a perfect bearing and grit proof link. On the underside of the plate 64 are two lugs 74 which engage corresponding hollows or seats 75 in the adjacent side of a grip plate 76 secured to the plate 64 by any suitable fastening means, the said lugs 74 operating to relieve the fastening means of strain or stress.

The grip plate 76 extends the full length of the underside of the plate 64 and is nearly as wide as the latter. This plate 76 has a curved tractive rib 78 running longitudinally from one end to the other end of plate 64, and in rear of the rib 78 is a decided concavity 79 to give a reliable hold or bite of the rib 78 in the ground surface. The pulling stress on the tractive means or link belt at the base or ground line is taken up by inserted solid links 80 centrally bent as at 81 to throw the opposite ends 82 and 83 out of alinement, or, to laterally deflect both link ends on reverse sides of the longitudinal center of each link, the said ends having pin holes 84 therein. These links are inserted in the channel bodies or housings 65 with ends alternately lapped and connected by pins 85 inserted through the alined holes 84 thereof. The several complete links constructed as above explained are assembled with the unflanged sides abutting against the flange sides and the projected convex ends 66 of the channels or housings 65 are fitted in the concave ends 68 of the adjacent channels or housings. The pins 85 have square heads 86, and are inserted through the holes 67 of the projected convex ends 66 and registered holes 84, of the links 80 by placing them in the hollow portions of the hollow or cavitied lugs or ribs 69 through the bottom openings 69ª and then pressing said pins outwardly until the squared heads 86 bear against the inner surfaces of the opposite end walls of the said lugs or ribs. After the pins 85 have been inserted, the hollow portions or cavities of the lugs or ribs 69 are filled with wooden blocks 87 to prevent the pins from working loose. The lugs or ribs 69 are thus adapted to perform a two-fold function, and after the blocks 87 are inserted therein they are materially strengthened. By applying the links 85 as specified they are fully housed and protected from accumulation of dirt and grit and work better with a longer or more durable service. The links are also effectively braced by the end overlap thereof and will always be maintained in true working positions by channels or the housings 65 in which they are disposed. The pins 85 are shielded or protected by their inclosure in the channels or housings 65 and the hollow lugs or ribs 69, and may be readily renewed or replaced when found necessary.

Figure 1:
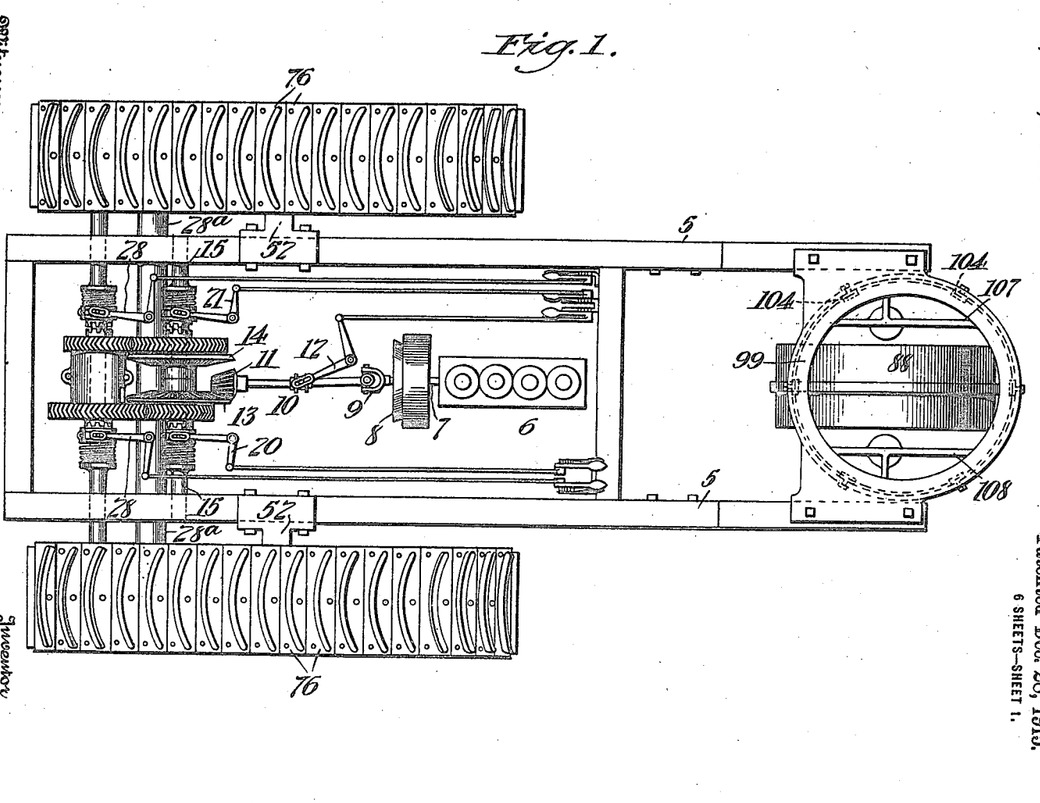
Figure 1 is a top plan view of sufficient structure of a tractor to illustrate the features of the invention and showing the transmission gear and adjacent parts in section.
Figure 2:
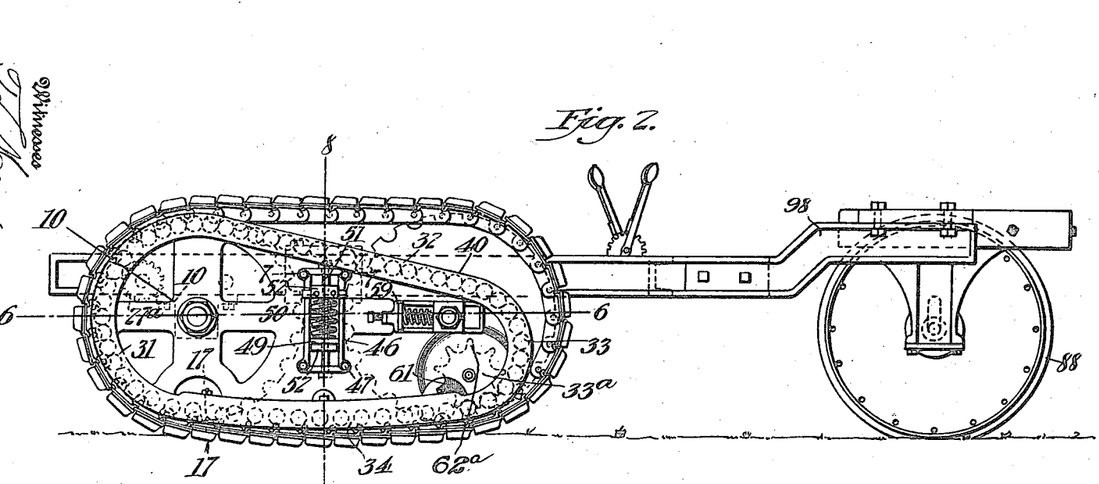
Fig. 2 is a side elevation of the same.
Figure 3:
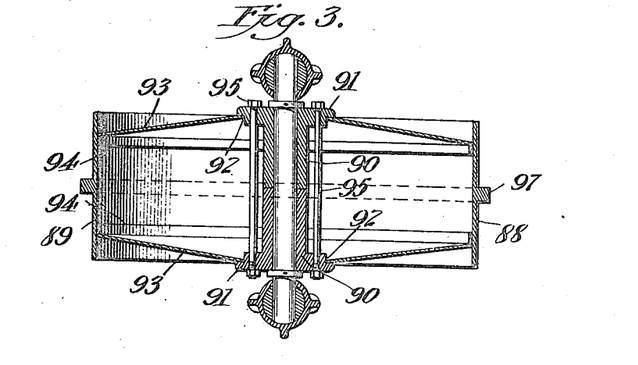
Fig. 3 is a horizontal section through the steering or tiller wheel.
Figure 4:
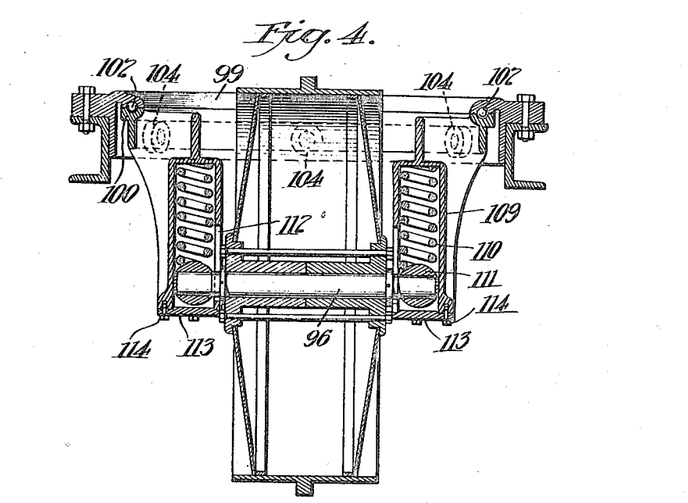
Fig. 4 is a transverse vertical section of the steering or tiller wheel organization as shown by Fig. 3 and a part of the frame.
Figure 5:
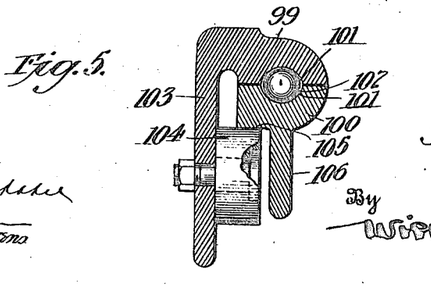
Fig. 5 is an enlarged detail cross section through the races of the tiller wheel.
Figure 6:
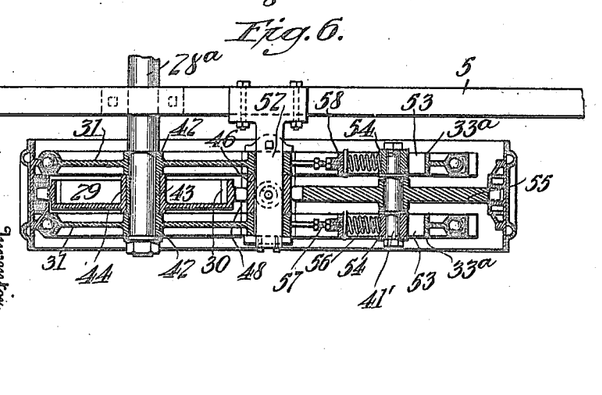
Fig. 6 is a horizontal section on the line 6—6 of Fig. 2.
Figure 7:
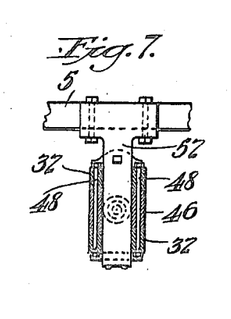
Fig. 7 is a transverse section on the line 7—7 of Fig. 2.

The mounting of the steering or tiller wheel is very much simplified in the present instance as compared to the usual structures of this class, and the friction thereon is also materially reduced. The steering or tiller wheel 88 embodies an outer circular rim 89, two half hubs 90 with end flanges 91 and shoulders 92, two conical side disk plates 93, two inner keeper rings 94 on the inner side of the rim 89 and to which the outer edges of the side plates are secured, and tie bolts 95. The inner edges of the side plates 93 engage the end flanges 91 and shoulders 92 and are held intact by inserting the tie bolts 95 through said flanges as clearly as shown by Fig. 3. The hubs 90 are also secured by the tie bolts 95 when applied and form a secure structure for the reception of an axle or shaft 96 inserted therethrough and projecting beyond opposite ends thereof. The rim 89 is also circumscribed by a centrally located tractive rib 97 having a function well understood.

The means for supporting the steering or tiller wheel relatively to the frame or body 5 consists of two forward extensions or parallel brackets 98 fitted and secured to the inner sides of the front ends of the body or frame side members or channels and providing a rigid structure. A circular ball race is supported by the brackets 98 and adjacent portion of the frame or body 5 and consists of upper and lower halves 99 and 100 with the inner opposing sides formed with semi-circular grooves 101 to provide a continuous circular race or channel for balls 102 inserted therein. The upper half 99 of this race has an outer depending flange 103 with anti-frictional rollers 104 mounted on the inner side thereof at intervals, there being preferably six of these rollers spaced regular distances over the flange. The lower half 100 of the ball race has an annular shoulder 105 bearing on the rollers 104 and an inner depending flange 106 and extending downwardly therefrom are two webs 107 and ribs 108 parallel to each other and a certain distance apart. The webs 107 and ribs 108 connect with or are secured to two downwardly projecting hollow columns 109 in which tension or relief springs 110 are mounted over ball bearings 111 having the opposite ends of the axle or shaft 96 in engagement therewith. The ends of the shaft 96 movably extend through slots 112 in the inner sides of the columns 109, said slots opening through the lower ends of the columns and normally closed by lower cap plates 113 secured by fastenings or suitable screw bolts 114. This steering or tiller wheel will be operated in the usual manner to guide the tractor in its movements.

The rollers 104 retain the lower half 100 of the ball race which is free to turn on the upper fixed half 99, in position, and reduce the friction on said lower half when operated by movement of the steering in opposite directions. The object of the hollow columns 109 with springs 110 and ball bearings 111 therein is to overcome side thrust and stress on the bearings caused by the steering wheel passing over obstacles on one side of the revolving rim 89 or wheel proper. The relief in such cases is effected in the ball bearings and friction is thereby reduced and materially overcome.

From the foregoing, the operation of the several mechanisms will be readily comprehended. The engine 6 operates the pinion shaft 10 and pinion 11 and the latter in turn actuates the sets of transmission and motion governing gears 13, 16, 22 and 23 and corresponding shafts 15 and 26 when said pinion 11 is shifted to mesh with bevel gear 13, or, the gears 14, 17, 22 and 23 and corresponding shafts 15 and 26 when pinion 11 is caused to engage the bevel gear 14, in accordance with the direction it is desired the tractor shall move. The bull pinions 27ª are uniformly actuated and the sprockets 29 rotated through the medium of the internal gears 30. The teeth of the sprockets 29 fully engage the lugs or ribs 69 and the connected link plates 64 are regularly shifted rearwardly or forwardly in accordance with the direction of rotation of the bull pinions 27ª and sprockets 29, and the grip plates 76 on the bottom portions of the crawler mechanisms sink into the ground surfaces in regular sequence and at the same time the balls 35 are continually shifting and revolving by contact therewith of the movable tractive means or chain belt, which continues its shifting engagement with the balls until the latter reach the upper rear portions of the forwardly and downwardly inclined directing ways 32 of the channels and races, the balls gravitating regularly to the spacer 61 which divides the balls as hereinbefore explained, and they then regularly move in spaced relation between the lower members 34 of the channels or races and the tractive means or on the bearing members 71 and against the flanges 70. The balls 35 by their particular mounting and regular service relatively to the link plates, together with the means for taking up and obviating side thrust as hereinbefore explained assist in maintaining the parts of the link belts in true alinement so that tendency to lateral strain and displacement, and irregular wear on the several parts are averted, and a positive or full pressure registration of the teeth of the sprockets 29 with the lugs or ribs 69 is insured with an economical dispensation of the driving power of the engine or motor and of the transmission gearing.

What is claimed is:—

1. In a tractor of the class specified, a body, motive means on the body, ball races fixed at opposite sides of the body and having upper forwardly and downwardly inclined ways extending from one end to the other, endless tractive means actuated by the motive means and consisting of a plurality of movably connected elements, and balls movable in the races and positively shifted during a portion of their travel by the tractive means and also having a gravitating movement through said inclined ways.

2. In a tractor of the class specified, a body, motive means thereon, continuous ball races fixed at opposite sides of the body having upper inclined ways extending from one end to the other, endless tractive means operatively connected to the said motive means, and balls in the races and engaged between both the races and tractive means at intervals and partially shifted by said tractive means and also automatically disengageable from the tractive means, and having a gravitating movement relatively to the races.

3. In a tractor of the class specified, a body, motive means thereon, continuous ball races fixed in pairs at opposite sides of the body, and having upper downwardly inclined portions extending from one end to the other, a drive sprocket and an idler sprocket respectively disposed between the rear and front portions of each pair of the races, the drive sprockets being operatively connected to the motive means, endless tractive means trained over the drive and idler sprockets, and balls in the races and engaged between both the races and tractive means at intervals and shifted by said tractive means.

4. In a tractor of the class specified, a body, motive means thereon, ball races at opposite sides of the body having upper downwardly and forwardly inclined members, endless tractive means movably mounted in coöperative relation to said races and operatively connected to the motive means, balls in the races and interposed at intervals between the races and tractive means, and spacers at the forward lower portions of the races to regularly separate the balls as they pass between the lower portions of the tractive means and races.

5. In a tractor of the class specified, a body, motive means thereon, ball races at opposite sides of the body, endless tractive means movably mounted in coöperative relation to the races and operatively connected to the motive means, ball in the races engaging between the tractive means and races during a portion of the travel of said tractive means, and spacers at the forward lower portions of the races to regularly separate the balls as they pass between the lower portions of the tractive means and races.

6. In a tractor of the class specified, a body, motive means thereon, ball races at opposite sides of the body having front and rear semi-circular ends, the rear semi-circular ends being of greater radius than the front semi-circular ends and the upper portions of the races inclining downwardly toward the front, tractive means trained over wheels having the same diameter and arranged in coöperative relation to the races and operatively connected to the motive means, and shiftable balls engaging the races and tractive means.

7. In a tractor of the class specified, a body, motive means thereon, a ball race carried by the body, endless tractive means actuated by the motive means and consisting of a plurality of movably connected elements, anti-friction devices movable in the race and engaged by the tractive means during only a part of the movement of the latter, and means operating independently of the tractive means designed to accelerate the passage of the anti-friction devices during the remaining part of the movement of the said tractive means.

8. In a tractor of the class specified, a body, motive means thereon, an endless race carried by the body, tractive means movably mounted in coöperative relation to the race and connected to the motive means, anti-friction devices in the race between the same and the tractive means and adapted to lie in close relationship during a part of the movement of the tractive means and means for spacing said anti-friction devices during the other part of the movement of said tractive means.

9. In a tractor of the class specified, a body, motive means thereon, driving means at opposite sides of the body operatively connected to the motive means, endless tractive belts trained over the driving means and comprising pivoted elements, ball races coöperating with the tractive belts, the latter during their travel moving over portions of the races, cover plates over the upper portions of the races not engaged by the belts to prevent dirt and grit from the belts falling thereinto, and balls mounted in said races and engaging the belts.

In testimony whereof I hereunto affix my signature in presence of two witnesses.

JOSEPH W. PORTER.

Witnesses:
   Mrs. F. W. Fordham,
   Geo. W. Peacock.